(12) United States Patent
Kogure

(10) Patent No.: US 7,738,782 B2
(45) Date of Patent: Jun. 15, 2010

(54) LENS POSITION DETECTOR

(75) Inventor: Yuji Kogure, Saitama (JP)

(73) Assignee: Hoya Corporation, Tokyo (JP)

( * ) Notice: Subject to any disclaimer, the term of this patent is extended or adjusted under 35 U.S.C. 154(b) by 537 days.

(21) Appl. No.: 11/766,211

(22) Filed: Jun. 21, 2007

(65) Prior Publication Data

US 2007/0297783 A1    Dec. 27, 2007

(30) Foreign Application Priority Data

Jun. 23, 2006    (JP) .............. 2006-173420

(51) Int. Cl.
*G03B 17/00* (2006.01)
(52) U.S. Cl. ................. 396/87; 359/825
(58) Field of Classification Search ............. 396/87, 396/142; 359/825; 348/347; 310/148, 151, 310/229, 230, 240, 242, 244, 245, 248
See application file for complete search history.

(56) References Cited

U.S. PATENT DOCUMENTS 5,144,493 A * 9/1992 Nomura ............ 359/825
5,327,184 A    7/1994 Nomura et al.
5,926,322 A * 7/1999 Iwasaki ............ 359/694

FOREIGN PATENT DOCUMENTS

JP    2593855    2/1999

OTHER PUBLICATIONS

U.S. Appl. No. 11/766,263 to Kogure et al., filed Jun. 21, 2007.

* cited by examiner

*Primary Examiner*—Melissa J Koval
*Assistant Examiner*—Autumn Parker
(74) *Attorney, Agent, or Firm*—Greenblum & Bernstein P.L.C.

(57) ABSTRACT

A lens position detector for detecting a position of a movable lens group in an optical axis direction includes a manual operating ring, a rotation of the manual operating ring causing the movable lens group to move in the optical axis direction; a code plate installed in a barrel; and a conductive brush fixed to the manual operating ring, the rotation of the manual operating ring causing relative rotational sliding between the conductive brush and the code plate. A surface of the code plate with which the conductive brush is in sliding contact is inclined to a plane orthogonal to the optical axis at an angle of inclination substantially equal to a lead angle of male and female screw threads engaged with each other which are formed on the manual operating ring and the ring member, respectively.

12 Claims, 5 Drawing Sheets

LENS POSITION DETECTOR

BACKGROUND OF THE INVENTION

1. Field of the Invention

The present invention relates to a lens position detector for a camera, and more specifically, relates to a lens position detector used for a lens barrel of a camera in which a lens group moves in an optical axis direction by a rotation of a manual operating ring provided on the lens barrel, wherein the detector is configured to be capable of detecting the position of the lens group in the optical axis direction with respect to the rotation position of the manual operating ring.

2. Description of the Related Art

A photographic lens barrel of a camera which is provided with a focus ring (manual operating ring) and a zoom ring (manual operating ring) that are operated by the user to change the position of one or more movable lens groups provided in the lens barrel in an optical axis direction to thereby adjust the focus and the focal length of the photographic lens, respectively, is known in the art. Various mechanisms for changing the position of one or more movable lens groups by a rotation of the focus ring or the zoom ring have been proposed. Among such mechanisms, a mechanism wherein a cam ring provided in a lens barrel rotates via a rotation of a manual operating ring, and a lens frame which supports a lens group is provided integrally with a set of cam rollers (cam followers) which are respectively engaged in a set of cam grooves formed in a cam ring to convert rotational movements of the cam ring into linear movements of the set of cam rollers, i.e., linear movements of the lens group supported by the lens frame, is known in the art.

With this type of mechanism, a lens position detector is incorporated in a lens barrel when it is required to detect the position of a movable lens group or groups in an optical axis direction to detect a state of focusing or zooming. For instance, Japanese Utility Model Publication No. 2593855 discloses such a lens position detector incorporated in a lens barrel. The lens barrel disclosed therein is provided with a code plate having a predetermined conductive pattern thereon which is fixed to one of a stationary portion of the lens barrel and a lens support frame for supporting a lens group and moves with the lens group in an optical axis direction, and is further provided with a conductive brush which is in sliding contact with the conductive pattern of the code plate so that the conductive brush slides on the conductive pattern as the lens support frame moves relative to the stationary portion of the lens barrel. Variations in shape of the conductor traces of the conductive pattern in the direction of sliding movement of the conductive brush thereon are detected via the conductive brush that is in contact with the conductive pattern, and the variations thus detected are output as an electrical signal to detect the position of the lens group in the optical axis direction. Another type of lens position detector is known in the art which detects the position of a movable lens group by detecting an angle of rotation of either a cam ring having an intimate relationship with the position of the movable lens group in the optical axis direction or a manual operating ring integral with the cam ring using a similar combination of a code plate and a conductive brush.

Providing a code plate and a conductive brush on internal elements of a lens barrel such as a lens support frame and a cam ring in a manner similar to that disclosed in the aforementioned utility model publication complicates the internal structure of the lens barrel and limits the arrangement of elements of the lens position detector because such elements must be arranged so as not to interfere with elements of a cam mechanism such as cam rollers, which makes it difficult to design the lens position detector. Accordingly, it is conceivable to mount one or more elements of a lens position detector to a manual operating ring positioned in the radially outermost part of the lens barrel. For instance, a conductive brush can be secured to a part of the manual operating ring to rotate with the manual operating ring about an optical axis, while a code plate is fixed to a part of a stationary ring which faces the conductive brush in the optical axis direction.

This structure is effectively used in the case where the manual operating ring rotates at a specific position (fixed position) in the optical axis direction. However, in the case where the manual operating ring is screwed into a stationary ring via screw threads (or helicoidal threads) in a manner similar to those of recently-produced lens barrels, the manual operating ring moves in the optical axis direction in accordance with the lead angle of the screw threads (or helicoidal threads) when the manual rotating ring is rotated, and accordingly, this movement of the manual rotating ring in the optical axis direction changes the distance between the code plate and the conductive brush that face each other. This change varies the contact pressure of the conductive brush on the code plate, thus making it impossible to maintain an ideal state of electrical contact between the code plate and the conductive brush. Therefore, there is a possibility that a proper electrical signal, i.e., a lens position detection signal may not be obtained in the long run. Additionally, in the case where the range of rotation of the manual rotating ring is great, there is a possibility that the conductive brush may become out of contact with the code plate to thereby make it impossible to obtain a lens position detection signal.

SUMMARY OF THE INVENTION

The present invention provides a lens position detector which maintains a constant contact pressure of the conductive brush on the code plate and detects the position of a movable lens group in an optical axis direction with a high degree of reliability.

According to an aspect of the present invention, a lens position detector is provided, for detecting a position of a movable lens group in an optical axis direction, the lens position detector including a manual operating ring which is screw-engaged with a barrel so as to be manually rotatable about the optical axis and movable in the optical axis direction, a rotation of the manual operating ring causing the movable lens group to move in the optical axis direction; a code plate fixed to one of the barrel and the manual operating ring; and a conductive brush fixed to the other of the barrel and the manual operating ring so that the code plate faces the conductive brush in substantially the optical axis direction, the rotation of the manual operating ring causing relative rotation between the conductive brush and the code plate about the optical axis while relatively sliding thereon. A surface of the code plate with which the conductive brush is in sliding contact is inclined to a plane orthogonal to the optical axis at an angle of inclination substantially equal to a lead angle of male and female screw threads engaged with each other which are formed on the manual operating ring and the barrel, respectively.

It is desirable for the code plate to be fixed to a first surface which is formed in the barrel, the first surface lying in a plane orthogonal to the optical axis, wherein the conductive brush is fixed to a second surface on the manual operating ring to face the first surface in the optical axis direction, and the surface of the code plate, with which the conductive brush is in sliding contact, is inclined to the first surface of the barrel.

It is desirable for the lens position detector to include a spacer interposed between the code plate and the first surface in order to incline the surface of the code plate with respect to the first surface of the barrel.

It is desirable for the spacer to be selected from among a plurality of spacers having different thicknesses, and for the angle of inclination to vary by exchanging the spacer, which is interposed between the code plate and the first surface of the barrel, with another of the plurality of spacers.

It is desirable for the barrel to be a stationary ring, the code plate being fixed to a the stationary ring.

It is desirable for the lens position detector to include a cam ring which rotates with the manual operating ring while moving with the manual operating ring in the optical axis direction when the manual operating ring is rotated, wherein the movable lens group is moved in the optical axis direction via a cam mechanism of the cam ring as the cam ring rotates while moving in the optical axis direction.

It is desirable for the manual operating ring to include a focus ring which is operated to perform a focusing operation, and for the movable lens group to serve as a focusing lens group.

It is desirable for the barrel to include an inner flange which extends radially inwards, toward the optical axis, the code plate being fixed to a surface of the inner flange which faces the conductive brush.

It is desirable for the code plate to be formed in an arc-shaped plate curved along a circumference of the barrel.

It is desirable for the manual operating ring to include a projection which projects toward the inner flange, the conductive brush being fixed to an end surface of the projection which faces the surface of the inner flange.

In an embodiment, a lens barrel is provided, including a stationary ring; a manual operating ring which is manually rotated to move a movable lens group in an optical axis direction, the manual operating ring being screw-engaged with the stationary ring so as to be manually rotatable about the optical axis and movable in the optical axis direction, a rotation of the manual operating ring causing the movable lens group to move in the optical axis direction via a cam mechanism; and a lens position detector for detecting a position of the movable lens group in the optical axis direction, the lens position detector including a code plate fixed to the stationary ring, and a conductive brush fixed to the manual operating ring. The rotation of the manual operating ring causes relative rotation between the conductive brush and the code plate about the optical axis while relatively sliding thereon. A surface of the code plate with which the conductive brush is in sliding contact is inclined with respect to a plane orthogonal to the optical axis at an angle of inclination substantially equal to a lead angle of male and female screw threads engaged with each other which are formed on the manual operating ring and the stationary ring, respectively.

It is desirable for the movable lens group to be moved in the optical axis direction by a rotation of the manual operating ring to perform one of a focusing operation and a zooming operation.

According to the present invention, a rotation of the manual operating ring causes the conductive brush to rotate with the manual operating ring, thus causing the conductive brush to slide on the surface of the code plate so that a detection signal which indicates a position of the movable lens group in the optical axis direction is output. Although the manual operating ring moves in the optical axis direction when rotated due to the engagement between the male and female screw threads while the conductive brush moves integrally with the manual operating ring in the optical axis direction while rotating integrally with the manual operating ring about the optical axis, the amount of movement of the conductive brush in the optical axis direction is canceled out by the inclination of the code plate since the code plate is inclined to correspond to the lead angle of the male and female screw threads of the manual operating ring and the lens barrel. Consequently, even if the conductive brush moves in the optical axis direction as the manual operating ring is rotated, the distance between the conductive brush and the surface of the code plate, with which the conductive brush is in sliding contact, is maintained constant at all times, so that the conductive brush is in contact with said code plate at a constant pressure at all times, which makes it possible to output a stable detection signal.

The present disclosure relates to subject matter contained in Japanese Patent Application No. 2006-173420 (filed on Jun. 23, 2006), which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
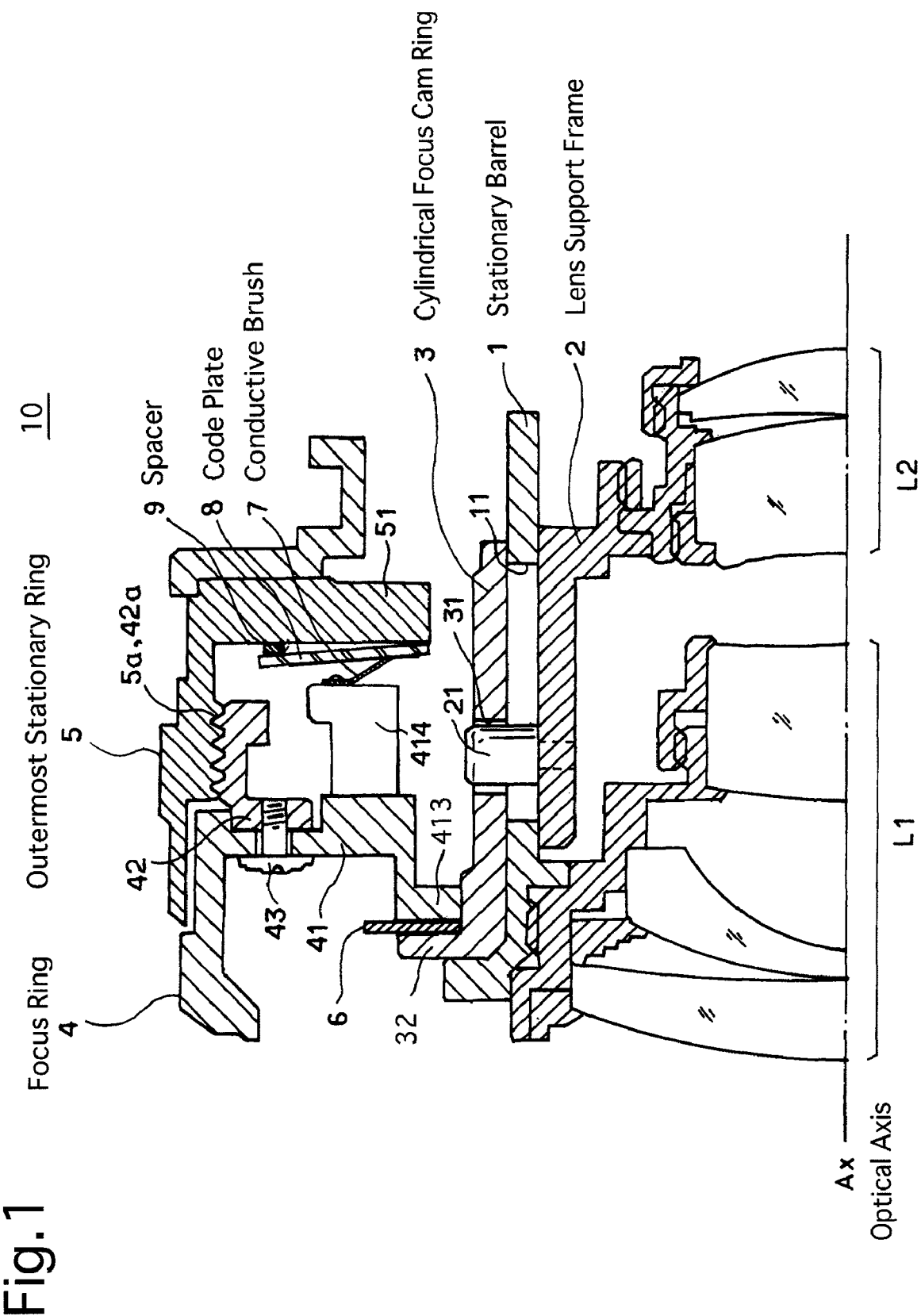
FIG. 1 is a longitudinal cross sectional view of primary elements of an embodiment of a lens barrel which incorporates a lens position detector according to the present invention, showing only an upper half of the lens barrel from the optical axis thereof.
Figure 2:
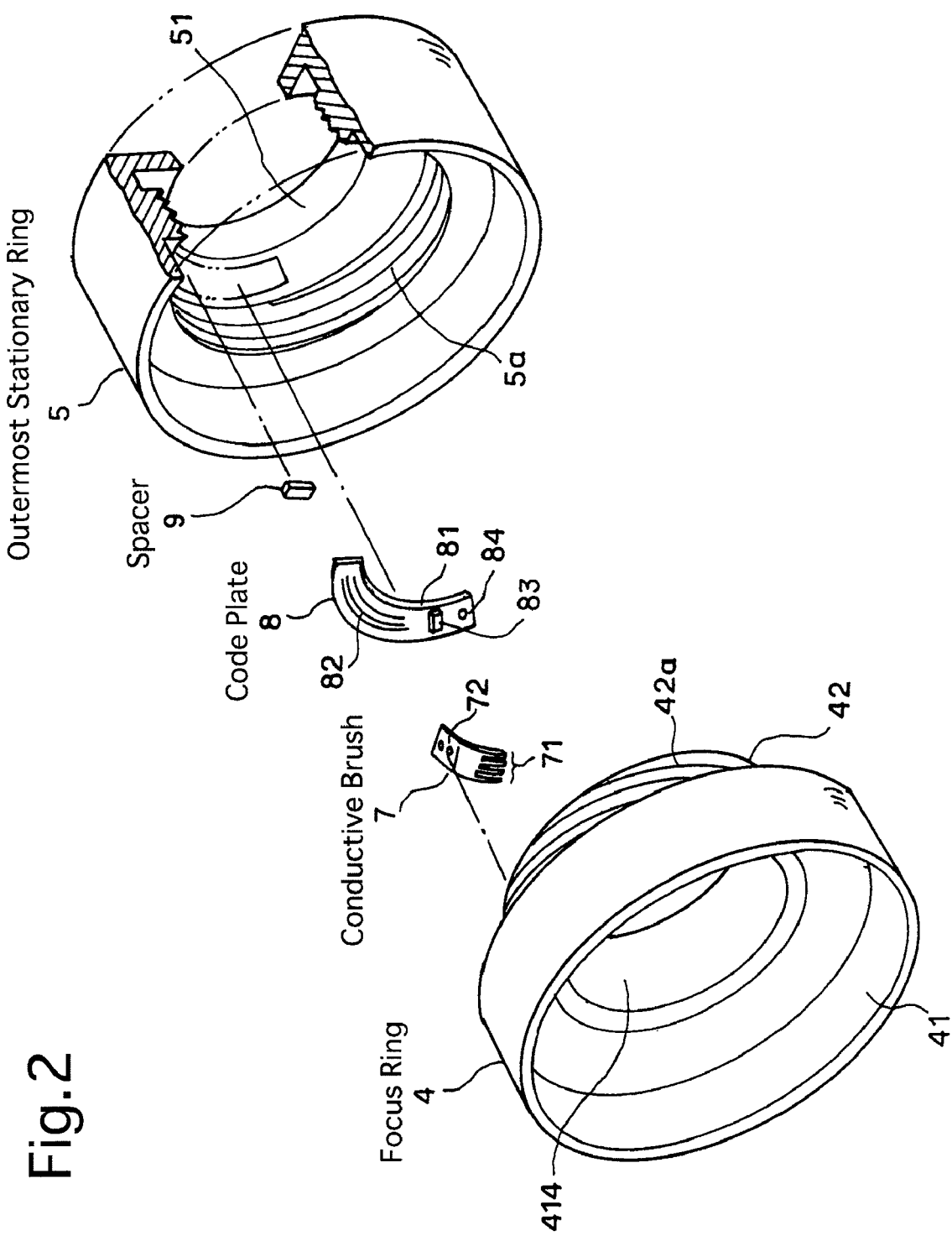
FIG. 2 is an exploded perspective view of several elements shown in FIG. 1, schematically showing the structures thereof.

FIG. 1 is a longitudinal cross sectional view of primary elements of an embodiment of a lens barrel 10 which includes a focusing mechanism to which the present invention is applied, and FIG. 2 is an exploded perspective view of several elements shown in FIG. 1, showing the schematic structures thereof. The lens barrel 10 is provided therein with a stationary barrel 1. The lens barrel 10 is provided, inside of the stationary barrel 1 at the front thereof, with a fixed lens group L1. The lens barrel 10 is provided, inside of the stationary barrel 1, with a lens support frame 2 which is movable along an optical axis Ax, i.e., in the optical axis direction. The lens support frame 2 supports a movable lens group L2. The movable lens group L2 serves as a focusing lens group which is moved in the optical axis direction to carry out a focusing operation. Although each of the fixed lens group L1 and the movable lens group L2 is a lens group consisting of more than one lens element in the illustrated embodiment of the lens barrel, each of the fixed lens group L1 and the movable lens group L2 can consist of a single lens element. The lens barrel 10 is provided therein with a cylindrical focus cam ring 3 that is fitted on the stationary barrel 1 to be rotatable relative to the stationary barrel 1 about the optical axis Ax. The lens barrel 10 is provided, at the front end thereof around the focus cam ring 3, with a focus ring (manual operating ring) 4 which is positioned in an outermost region of the lens barrel 1 to be manually operated. The focus cam ring 3 is joined to the focus ring 4 to be integral therewith. The focus cam ring 3 is provided with a plurality of cam slots 31 (only one of them is shown in FIG. 1) in which a plurality of cam rollers (cam followers; only one of them is shown in FIG. 1) 21 which project radially outwards from the lens support frame 2 are engaged through a plurality of linear guide slots 11 (only one of them is shown in FIG. 1) formed in the stationary barrel 1, respectively. In this cam mechanism, a rotation of the focus cam ring 3 about the optical axis Ax causes the lens support frame 2 (the movable lens barrel L2 that is supported by the support frame 2) to move in the optical axis direction according to the camming action between the cam slots 31 and the cam rollers 21, so that a focusing operation of the lens barrel 10 occurs.

The focus ring 4 is screw-engaged with an outermost stationary ring (barrel) 5 that is positioned in an outermost region of the lens barrel 1 immediately behind the focus ring 4. The focus ring 4 is composed of two parts: an operating ring member 41 that is manually operated directly by the user, and a sub-ring member 42 which is secured to the operating ring member 41 to be positioned immediately behind the operating ring member 41. Although the operating ring member 41 and the outermost stationary ring 5 are positioned at substantially the same position in radial directions (at substantially the same height from the optical axis Ax as viewed in FIG. 1), the sub-ring member 42 is formed to be smaller in diameter than the outermost stationary ring 5 to be positioned radially inside of the outermost stationary ring 5. The sub-ring member 42 is provided on an outer peripheral surface thereof with a male thread portion (fine-thread portion) 42a, and the outermost stationary ring 5 is provided on an inner peripheral surface thereof with a female thread portion (fine-thread portion) 5a which is engaged with the male thread portion 42a. The operating ring member 41 and the sub-ring member 42 are fixed to each other at three different positions in a circumferential direction about the optical axis Ax by three set screws 43 (only one of them is shown in FIG. 1). The three set screws 43 pass through three circular arc slots, respectively, which are made in the operating ring member 41 along a common circle about the optical axis Ax to allow the operating ring member 41 and the sub-ring member 42 to be rotated relative to each other about the optical axis Ax in a predetermined range of rotation upon the three set screws 43 being loosened to make it possible to carry out a focus adjustment operation, which is usually carried out at an appropriate point in the manufacturing process. The detailed description of this focus adjustment operation and the related structure of the lens barrel 10 are omitted.

According to such a configuration of the mechanism of the lens barrel 10 which is associated with the focus ring 4, rotating the focus ring 4 causes the operating ring member 41 thereof to rotate with the sub-ring member 42 about the optical axis Ax. This rotation of the sub-ring member 42 causes the focus ring 4, which is integral with the sub-ring member 42, to move in the optical axis direction by a small amount of movement relative to the outermost stationary ring 5 due to the engagement of the female thread portion 5a with the male thread portion 42a.

The focus cam ring 3 is provided at the front end thereof in the optical axis direction with an outer flange 32 which projects radially outwards, and the operating ring member 41 of the focus ring 4 is provided at the front end thereof in the optical axis direction with an inner flange 413 which is secured to the outer flange 32 of the focus cam ring 3 to be integral therewith by set screws (not shown) with an adjustment shim 6 being sandwiched between the inner flange 413 and the outer flange 32. The adjustment shim 6 is formed in an annular member having a predetermined thickness. The adjustment shim 6 is selected from among a plurality of adjustment shims having different thicknesses to be interposed between the inner flange 413 and the outer flange 32. Selecting one adjustment shim having an appropriate thickness from among the plurality of adjustment shims prepared in advance and interposing the adjustment shim thus selected as the adjustment shim 6 between the inner flange 413 and the outer flange 32 makes it possible to adjust the relative position between the focus cam ring 3 and the focus ring 4 in the optical axis direction by the amount of thickness of the adjustment shim 6, thus making it possible to make an adjustment to the position of the focus support ring 2, which is used to perform a focus adjustment operation, in the optical axis direction, i.e., to make an adjustment to the position of the movable lens group L2 in the optical axis direction.

Figure 3:
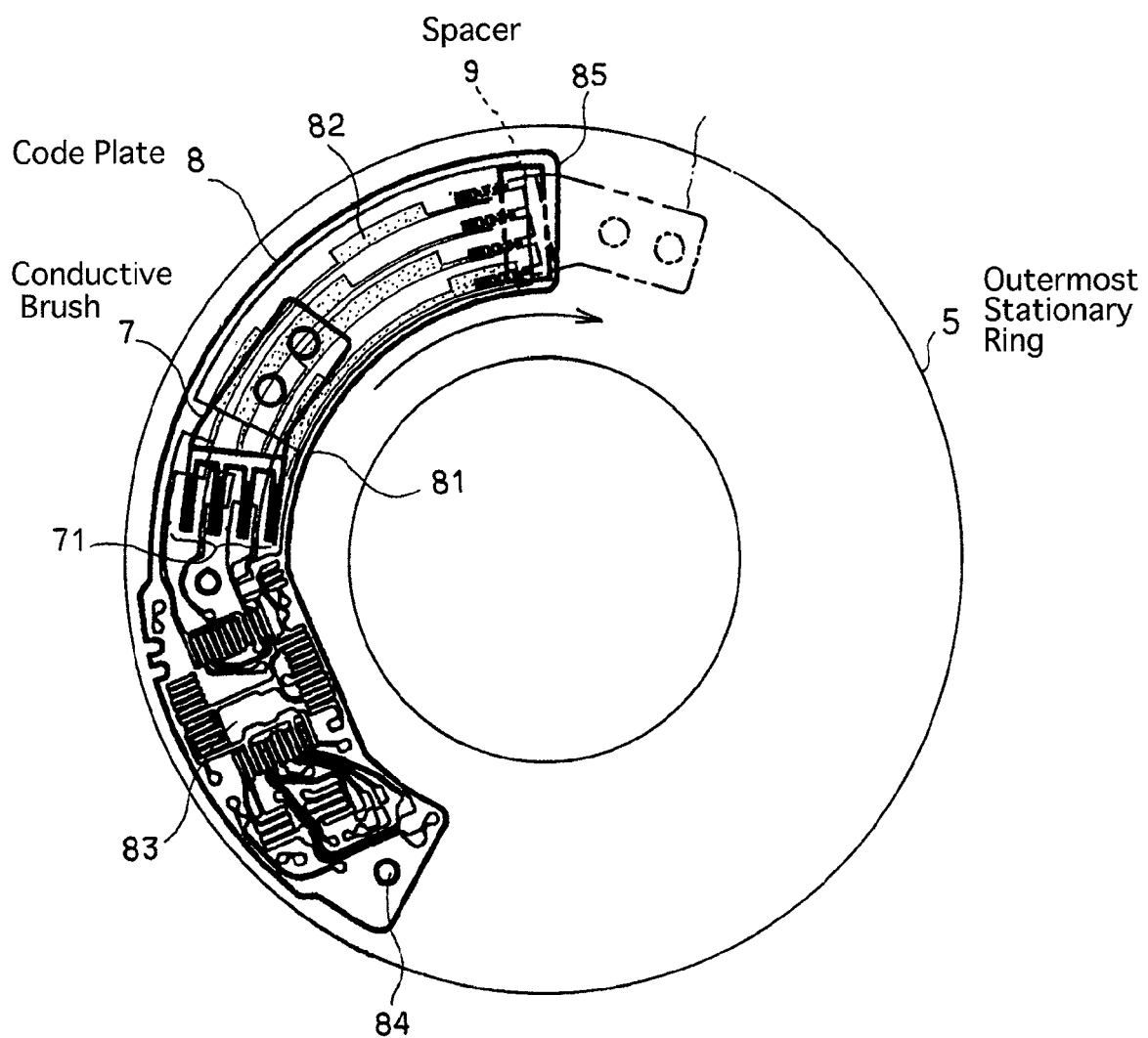
FIG. 3 is a front elevational view of the elements of the lens barrel shown in FIG. 2, showing a conductive brush and a code plate that are viewed from the front of the lens barrel in the optical axis direction.

The operating ring member 41 of the focus ring 4 is provided, on a portion of a rear end surface of the operating ring member 41, with a stem (projection) 414 which projects rearward in the optical axis direction, and a conductive brush 7, which serves as an element of a lens position detector for detecting the position of the movable lens group L2 in the optical axis direction, is fixed to the rear end surface of the stem 414 to extend obliquely rearward. The outermost stationary ring 5 is provided at the rear end thereof with an inner flange 51 which extends radially inwards so that the front surface of the inner flange 51 faces the rear surface of the operating ring member 41. A code plate 8 that serves as an element of the aforementioned lens position detector for detecting the position of the movable lens group L2 in the optical axis direction is fixed to a portion of the front surface of the inner flange 51 of the outermost stationary ring 5 with a contacting surface of the code plate 8 facing forward. FIG. 3 shows front views of the conductive brush 7 and the code plate 8 as viewed from the front in the optical axis direction. The conductive brush 7 is made of a resilient conductive plate, e.g., a copper alloy plate and formed in a predetermined shape by punching. The conductive brush 7 is provided with four contacts (conductive strips) 71 which are connected together in the vicinity of a base end 72 of the conductive brush 7 to extend parallel to one another. The conductive brush 7 is secured at the base end 72 to the stem 414 by set screws. The code plate 8 is provided with an insulating substrate 81 serving as a primary element of the code plate 8. The code plate 8 is formed as an arc-shaped plate curved along a circumference of the outermost stationary ring 5. Although the detailed description of the code plate 8 is omitted since the basic structure thereof is well-known in the art, a predetermined conductive pattern including four traces (conductor traces) 82 with which the four contacts 71 of the conductive brush 7 are in sliding contact, respectively, is formed on the insulating substrate 81 so that different code signals are generated at different circumferential positions, respectively. Various electronic components 83 which are electrically connected to the four traces 82 are provided on the insulating substrate 81 to output a code signal or a signal obtained by decoding this code signal in accordance with a state of electrical continuity of the four traces 82.

Figure 4:
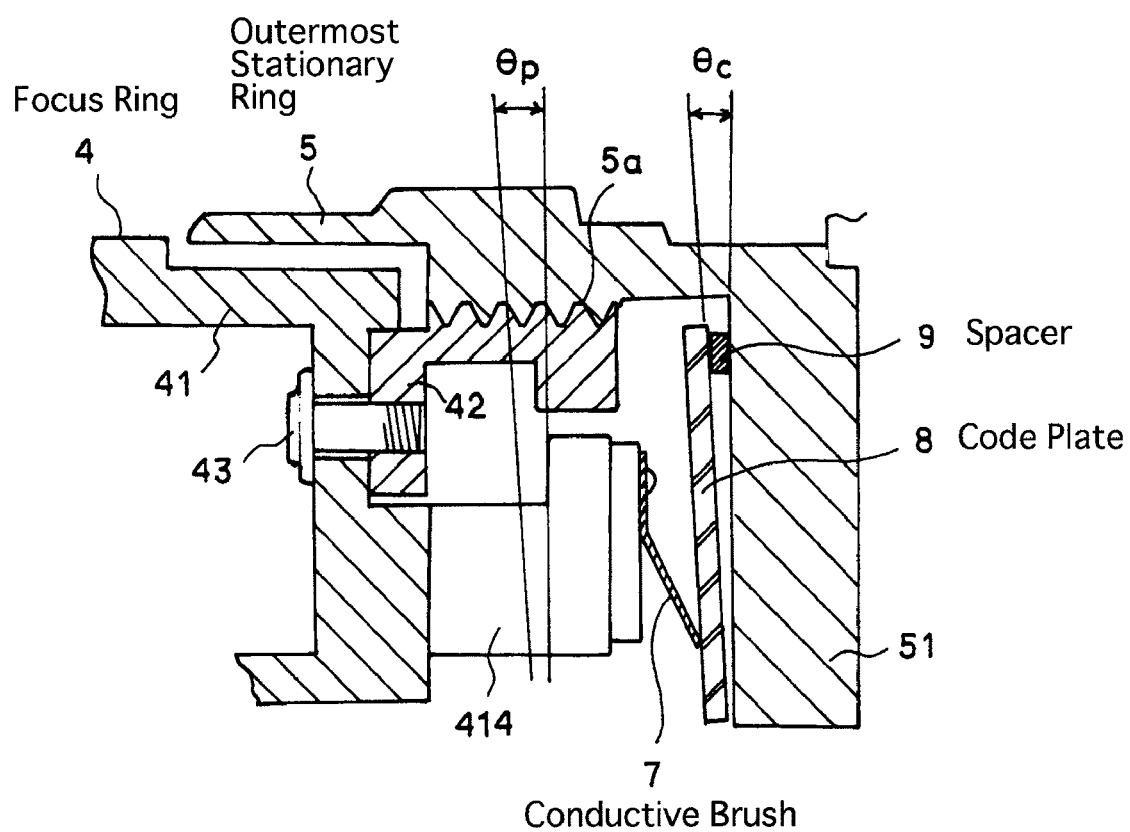
FIG. 4 is an enlarged cross sectional view of a portion of the lens barrel shown in FIG. 1.

The code plate 8 is secured, at one end 84 thereof (in a circumferential direction of the outermost stationary ring 5) to a front surface of the inner flange 51 in the optical axis direction by a set screw (not shown). As shown in FIGS. 3 and 4, a spacer 9 is interposed between the front surface of the inner flange 51 and a rear surface of the code plate 8 in the vicinity of the other end 85 thereof. The spacer 9 is selected from among a plurality of spacers having different thicknesses. Upon the installation of the spacer 9, the code plate 8 is fixed to the inner flange 51 to be supported thereby in a state where the code plate 8 is slightly inclined to the front surface of the inner flange 51, i.e., inclined to a plane orthogonal to the optical axis Ax. The angle of this inclination shown by "θc" in FIG. 4 is made to be identical to a lead angle "θp" of the female thread portion 5a that is formed on the outermost stationary ring 5. A fine adjustment can be made to the angle of the inclination θc by changing the position of the spacer 9 in the circumferential direction of the outermost stationary ring 5.

According to the above described embodiment of the lens barrel, manually rotating the focus ring 4 causes the operating ring member 41 to rotate, thus causing the sub-ring member 42 that is secured to the operating ring member 41 to rotate integrally therewith. As the sub-ring member 42 rotates, the sub-ring member 42 moves in the optical axis direction in accordance with the lead angle θ p of the female thread portion 5a (i.e., the lead angle of the male thread portion 42a) by an amount of displacement corresponding to the amount of the rotation of the sub-ring member 42 since the sub-ring member 42 is screw-engaged with the outermost stationary ring 5 via the engagement of the male thread portion 42a with the female thread portion 5a. This movement of the sub-ring member 42 in the optical axis direction causes the operating ring member 41 (i.e., the focus ring 4) to move with the sub-ring member 42 in the optical axis direction. The rotation of the operating ring member 41 about the optical axis Ax and the movement of the operating ring member 41 in the optical axis direction cause the focus cam ring 3 to rotate with the operating ring member 41 while moving with the same in the optical axis direction. Due to this rotation of the focus cam ring 3 about the optical axis O and this movement of the focus cam ring 3 in the optical axis direction, the plurality of cam rollers 21 that are respectively engaged in the plurality of cam slots 31 move in the optical axis direction, so that lens support frame 2, i.e., the movable lens group L2 moves in the optical axis direction. Consequently, the movable lens group L2 moves to a position in the optical axis direction which corresponds to the rotation position of the focus ring 4 to thereby carry out a focusing operation.

Figure 5A:
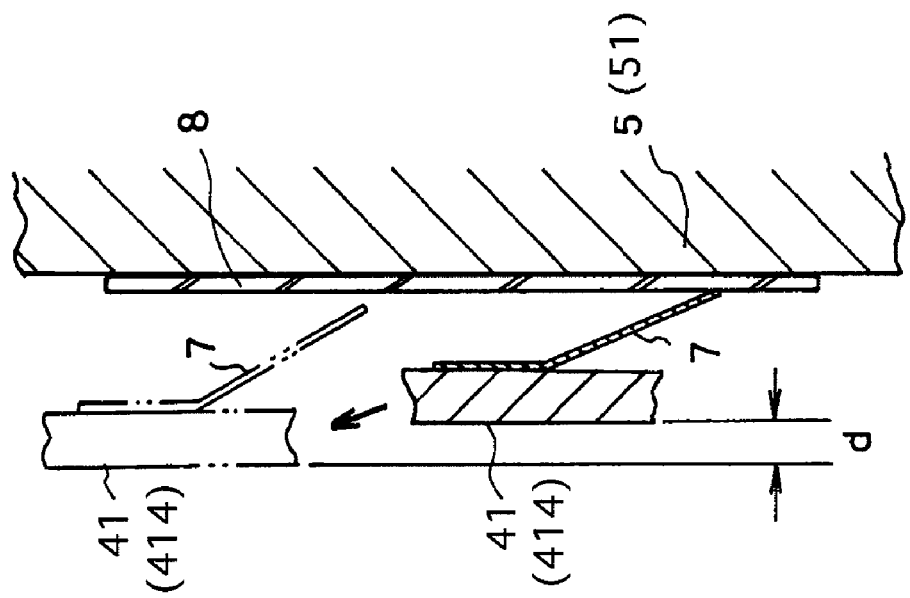
FIG. 5A is a schematic cross sectional view of a portion of the lens barrel shown in FIGS. 1 and 4 to illustrate operations of the conductive brush and the code plate.
Figure 5B:
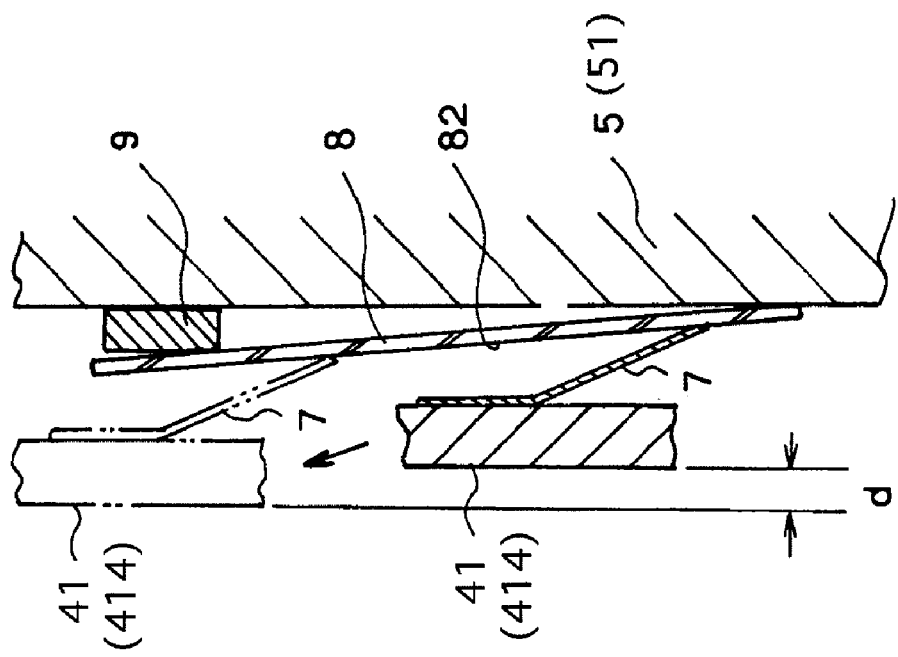
FIG. 5B is a view similar to FIG. 5A, illustrating operations of the conductive brush and the code plate in a comparative example which is compared with the embodiment shown in FIG. 5A.

As shown by the arrow shown in FIG. 3 and different rotation positions of the conductive brush 7 with respect to the code plate 8 which are respectively shown in FIG. 3 by solid lines and two-dot chain lines, the conductive brush 7 that is fixed to the operating ring member 41 rotates with the operating ring member 41 in accordance with rotation of the focus ring 4 while sliding on the four traces 82 of the code plate 8 that is fixed to the outermost stationary ring 5, so that a detection signal indicating the position of the movable lens group L2 in the optical axis direction is output in accordance with variations in a state of electrical continuity of the four contacts 71 of the conductive brush 7. This detection signal is input to, e.g., a CPU or the like provided in a camera body (not shown) to which the lens barrel 10 is mounted. At this time, as the focus ring 4 rotates, the focus ring 4 moves in the optical axis direction by an amount of movement corresponding to the lead angle θp of the female thread portion 5a and the male thread portion 42a while the conductive brush 7 moves with the focus ring 4 in the optical axis direction as described above since the sub-ring member 42 of the focus ring 4 is screw-engaged with the outermost stationary ring 5 via the engagement of the female thread portion 5a with the male thread portion 42a. Consequently, the conductive brush 7 moves in a direction away from the position at which the conductive brush 7 contacts the surface of the code plate 8 by a distance (moving distance) "d" from the position shown by a solid line to the position shown by a two-dot chain line in FIG. 5A. However, since the code plate 8 is inclined to a plane orthogonal to the optical axis Ax at the angle of inclination θc, equal to the lead angle θp of the female thread portion 5a and the male thread portion 42a in the above illustrated embodiment of the lens barrel, the moving distance d of the conductive brush 7 in the optical axis direction is equal to the amount of displacement of a point of contact of the conductive brush 7 with the surface (the four traces 82) of the code plate 8 in the optical axis direction from before the focus ring 4 is rotated to after the focusing ring 4 is rotated. Therefore, even if the conductive brush 7 moves in the optical axis direction as the focus ring 4 is rotated, the distance between the conductive brush 7 and the four traces 82 on the code plate 8 in the optical axis direction is maintained constant at all times, so that the conductive brush 7 is in contact with the code plate 8 at a constant pressure at all times, which makes it possible to output a stable detection signal. FIG. 5B is a comparative example to be compared with the embodiment shown in FIG. 5A. If the code plate 8 is mounted to the front surface of the inner flange 51 of the outermost stationary ring 5 to lie in a plane orthogonal to the optical axis Ax as shown in FIG. 5B, the distance between the conductive brush 7 and the surface (the four traces 82) of the code plate 8 changes when the conductive brush 7 moves as the focus ring 4 (the operating ring member 41 that is provided with the stem 414 having the conductive brush 7 thereon) rotates as shown in FIG. 5B, in which different rotation positions of the conductive brush 7 with respect to the code plate 8 are shown by solid lines and two-dot chain lines. Such a change of distance makes the state of contact between the conductive brush 7 and the code plate 8 unstable.

Although the code plate 8 is positioned inclined to a plane orthogonal to the optical axis Ax at the angle of inclination θc, which is equal to the lead angle θp of the female thread portion 5a and the male thread portion 42a in the above illustrated embodiment of the lens barrel, a similar effect can be obtained as long as the angle of inclination θc is almost the same as the lead angle θp (i.e., the angle of inclination θc does not necessarily have to be precisely identical to the lead angle θ p), since a required margin can be obtained in the optical axis direction by the fact that the conductive brush 7 comes in contact with the code plate 8 while being resiliently deformed in the optical axis direction. Furthermore, although the spacer 9 is installed to tilt the code plate 8 in the above illustrated embodiment of the lens barrel, it is possible to tilt the code plate 8 using set screws for fixing the code plate 8 to the outermost stationary ring 5 at opposite ends thereof in a circumferential direction of the outermost stationary ring 5, respectively. In this case, for instance, a washer can be put on each of these set screws to be interposed between the code plate 8 and the outermost stationary ring 5. Alternatively, an insulating substrate whose thickness changes in a circumferential direction of the outermost stationary ring 5 can be used as an insulating substrate for the code plate 8 instead of the insulating substrate 81 that has a constant thickness.

The lens position detector according to the present invention is not limited solely to the particular embodiment of the lens position detector described above, which is configured to detect the position of a movable lens group in the optical axis direction which is moved to carry out a focusing operation. The lens position detector according to present invention can be applied to any mechanism for moving a lens group in an optical axis direction as a manual operating ring is rotated; for instance, it is possible that the lens position detector according to the present invention be configured to detect the position of a movable lens group in the optical axis direction which is moved to carry out a zooming operation.

Additionally, the structure of the code plate that serves as an element of the lens position detector according to the present invention is not limited solely to the particular structure of the code plate 8 in the above described embodiment of the lens barrel, which is fixed to a stationary barrel of a lens barrel to be supported thereby. For instance, the present invention can also be applied to a different type of lens position detector in a similar manner as long as the lens position detector is configured so that a conductive brush and a code plate are mounted to one and the other of two ring members which are moved relative to each other in an optical axis direction.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens position detector for detecting a position of a movable lens group in an optical axis direction, said lens position detector comprising:
    a manual operating ring which is screw-engaged with a barrel so as to be manually rotatable about said optical axis and movable in the optical axis direction, a rotation of said manual operating ring causing said movable lens group to move in said optical axis direction;
    a code plate fixed to one of said barrel and said manual operating ring; and
    a conductive brush fixed to the other of said barrel and said manual operating ring so that said code plate faces said conductive brush in substantially the optical axis direction, said rotation of said manual operating ring causing relative rotation between said conductive brush said code plate about said optical axis while relatively sliding thereon,
    wherein a surface of said code plate with which said conductive brush is in sliding contact is inclined to a plane orthogonal to said optical axis at an angle of inclination substantially equal to a lead angle of male and female screw threads engaged with each other which are formed on said manual operating ring and said barrel, respectively.

2. The lens position detector according to claim 1, wherein said code plate is fixed to a first surface which is formed in said barrel, said first surface lying in a plane orthogonal to the optical axis,
    wherein said conductive brush is fixed to a second surface on said manual operating ring to face said first surface in said optical axis direction, and
    wherein said surface of said code plate, with which said conductive brush is in sliding contact, is inclined to said first surface of said barrel.

3. The lens position detector according to claim 2, further comprising a spacer interposed between said code plate and said first surface in order to incline said surface of said code plate with respect to said first surface of said barrel.

4. The lens position detector according to claim 3, wherein said spacer is selected from among a plurality of spacers having different thicknesses, and
    wherein said angle of inclination varies by exchanging said spacer, which is interposed between said code plate and said first surface of said barrel, with another of said plurality of spacers.

5. The lens position detector according to claim 1, wherein said barrel comprises a stationary ring, said code plate being fixed to a said stationary ring.

6. The lens position detector according to claim 1, further comprising a cam ring which rotates with said manual operating ring while moving with said manual operating ring in said optical axis direction when said manual operating ring is rotated,
    wherein said movable lens group is moved in said optical axis direction via a cam mechanism of said cam ring as said cam ring rotates while moving in said optical axis direction.

7. The lens position detector according to claim 1, wherein said manual operating ring comprises a focus ring which is operated to perform a focusing operation, and
    wherein said movable lens group serves as a focusing lens group.

8. The lens position detector according to claim 1, wherein said barrel includes an inner flange which extends radially inwards, toward said optical axis, said code plate being fixed to a surface of said inner flange which faces said conductive brush.

9. The lens position detector according to claim 8, wherein said manual operating ring comprises a projection which projects toward said inner flange, said conductive brush being fixed to an end surface of said projection which faces said surface of said inner flange.

10. The lens position detector according to claim 1, wherein said code plate is formed in an arc-shaped plate curved along a circumference of said barrel.

11. A lens barrel comprising:
    a stationary ring;
    a manual operating ring which is manually rotated to move a movable lens group in an optical axis direction, said manual operating ring being screw-engaged with said stationary ring so as to be manually rotatable about said optical axis and movable in the optical axis direction, a rotation of said manual operating ring causing said movable lens group to move in said optical axis direction via a cam mechanism; and
    a lens position detector for detecting a position of said movable lens group in said optical axis direction, said lens position detector including a code plate fixed to said stationary ring, and a conductive brush fixed to said manual operating ring,
    wherein said rotation of said manual operating ring causes said relative rotation between said conductive brush and said code plate said optical axis while relatively sliding thereon, and
    wherein a surface of said code plate with which said conductive brush is in sliding contact is inclined with respect to a plane orthogonal to said optical axis at an angle of inclination substantially equal to a lead angle of male and female screw threads engaged with each other which are formed on said manual operating ring and said stationary ring, respectively.

12. The lens barrel according to claim 11, wherein said movable lens group is moved in said optical axis direction by a rotation of said manual operating ring to perform one of a focusing operation and a zooming operation.

* * * * *